(12) United States Patent  
Morgan

(10) Patent No.: US 10,504,091 B1  
(45) Date of Patent: Dec. 10, 2019

(54) SYSTEM INCLUDING DIGITAL PROMOTION BASED UPON PRODUCT QUANTITY PROMOTION THRESHOLD AND RELATED METHODS

(71) Applicant: INMAR CLEARING, INC., Winston-Salem, NC (US)

(72) Inventor: Rex Morgan, Greensboro, NC (US)

(73) Assignee: INMAR CLEARING, INC., Winston-Salem, NC (US)

(*) Notice: Subject to any disclaimer, the term of this patent is extended or adjusted under 35 U.S.C. 154(b) by 525 days.

(21) Appl. No.: 15/240,553

(22) Filed: Aug. 18, 2016

(51) Int. Cl.
| | |
|---|---|
| G06G 1/12 | (2006.01) |
| G06Q 20/00 | (2012.01) |
| G06Q 40/00 | (2012.01) |
| G06Q 20/20 | (2012.01) |
| G06Q 30/02 | (2012.01) |

(52) U.S. Cl.  
CPC ....... G06Q 20/202 (2013.01); G06Q 30/0277 (2013.01)

(58) Field of Classification Search  
None  
See application file for complete search history.

(56) References Cited

U.S. PATENT DOCUMENTS

| 7,233,914 | B1 | 6/2007 | Wijaya et al. | |
|---|---|---|---|---|
| 7,784,702 | B2 | 8/2010 | Michels | |
| 2003/0218330 | A1 | 11/2003 | Mortimer | |
| 2010/0287029 | A1* | 11/2010 | Dodge | G06Q 30/02 705/7.31 |
| 2013/0339238 | A1* | 12/2013 | Unland | G06Q 30/0617 705/44 |
| 2014/0164171 | A1* | 6/2014 | Lu | G06Q 30/0207 705/26.7 |
| 2015/0058108 | A1* | 2/2015 | Winters | G06Q 20/10 705/14.23 |
| 2015/0199324 | A1* | 7/2015 | Nishioka | G06F 16/951 715/212 |

* cited by examiner

*Primary Examiner* — Ariel J Yu  
(74) *Attorney, Agent, or Firm* — Allen, Dyer, Doppelt + Gilchrist, P.A.

(57) ABSTRACT

A system may include a point-of-sale (POS) terminal and a database configured to store respective package quantity data for different package configurations for each product from among products, and to store respective product quantity promotion threshold data for each product. The system may also include a controller coupled to the database and the POS terminal and configured to calculate, based upon the stored package quantity data, a given product quantity for a given purchase of a plurality of different package configurations of the given product at the POS terminal. The controller may be configured to compare the given product quantity to a respective product quantity promotion threshold from among the stored product promotion threshold data, and when the given product quantity is above the respective product quantity promotion threshold, then award a digital promotion for redemption.

19 Claims, 4 Drawing Sheets

SYSTEM INCLUDING DIGITAL PROMOTION BASED UPON PRODUCT QUANTITY PROMOTION THRESHOLD AND RELATED METHODS

TECHNICAL FIELD

The present invention is related to the field of electronics, and more particularly, to a system for processing package configurations of a given product, and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

Moreover, some coupons may be for a specific size and/or package type of the given product. For example, a coupon may be for a 6-pack of 12 ounce cans of an item, or for a 10 ounce or larger package of a particular product. However, a consumer may prefer 16 ounce bottles of the product instead of the 12 ounce cans, in which case the consumer may not be able to redeem the discount, and thus may be disinterested in the product.

SUMMARY

A system may include a point-of-sale (POS) terminal and a database configured to store respective package quantity data for different package configurations for each product from among a plurality of products. The database is also configured to store respective product quantity promotion threshold data for each product of the plurality thereof. The system may also include a controller coupled to the database and the POS terminal. The controller may be configured to calculate, based upon the stored package quantity data, a given product quantity for a given purchase of a plurality of different package configurations of the given product at the POS terminal. The controller may be configured to compare the given product quantity to a respective product quantity promotion threshold from among the stored product promotion threshold data, and when the given product quantity is above the respective product quantity promotion threshold, then award a digital promotion for redemption. Accordingly, the system may award a digital promotion based upon a threshold quantity of a given product in different package configurations.

The package quantity data may include a respective number of product containers for each different package. The package quantity data may also include a respective product volume for each product container, for example. The package quantity data may also include a respective product weight for each product container.

The POS terminal may be geographically spaced apart from the database and controller. The POS terminal and controller may be configured to communicate via the Internet, for example.

The POS terminal may be configured to redeem the digital promotion during the given purchase. The database may also be configured to store respective manufacturer information for each product, for example. The database may also be configured to store respective brand information for each product.

A method aspect is directed to a method of awarding a digital promotion. The method may include storing in a database respective package quantity data for different package configurations for each product from among a plurality of products. Respective product quantity promotion threshold data for each product of the plurality thereof may also be stored in the database. The method may also include using a controller coupled to the database and the POS terminal to calculate, based upon the stored package quantity data, a given product quantity for a given purchase of a plurality of different package configurations of the given product at the POS terminal. The method may also include using the controller to compare the given product quantity to a respective product quantity promotion threshold from among the stored product promotion threshold data, and when the given product quantity is above the respective product quantity promotion threshold, then award a digital promotion for redemption.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
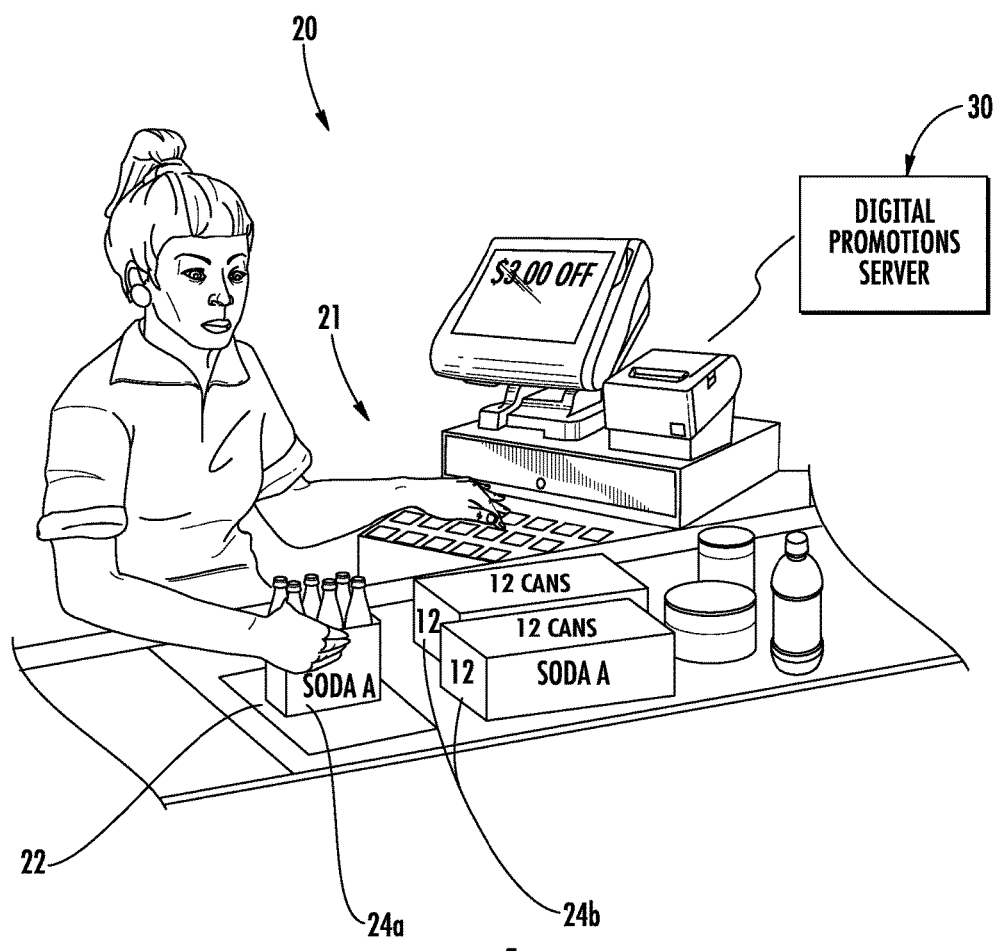
FIG. 1 is a diagram of a product checkout event using a system according to an embodiment.
Figure 2:
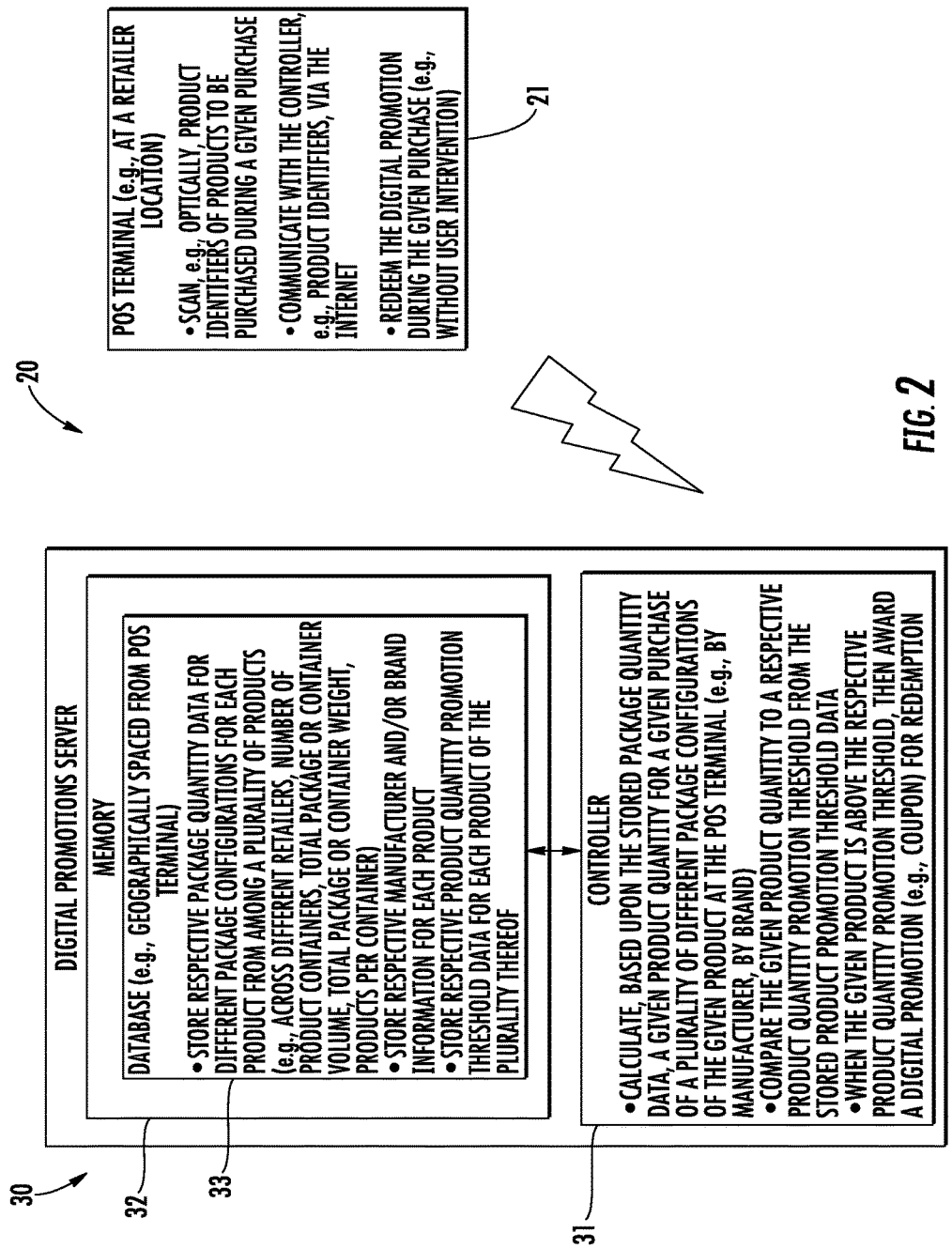
FIG. 2 is a schematic block diagram of the system of FIG. 1.

Referring to FIGS. 1 and 2 a system 20 includes a point-of-sale (POS) terminal 21. The POS terminal 21 may be located at a retailer location, for example, and may include an optical reader 22 for scanning product identifiers, for example, UPC codes, during a purchase transaction. Of course, the POS terminal 21 may scan other types of product identifiers and may include other and/or additional input devices for processing the purchase transaction of the products.

The system 20 also includes a database 33. The database 33 may be stored in a memory 32 coupled to a controller 31 of a digital promotions server 30. The digital promotions server 30, and more particularly, the database 33 is geographically spaced apart from and coupled to the POS terminal 21, for example, via the Internet. In some embodiments, the database 33 may be collocated with the POS terminal 21 and/or may communicate with the POS terminal 21 via a link other than the Internet.

The database 33 stores respective package quantity data for different package configurations for each product from among a plurality of products. The respective package quantity data may be for products across different retailers, for example. More particularly, a given product may be available or sold in different package configurations, such as, for example, different sized and types of containers (e.g., cans, bottles, and jugs). The given product may also be available in different sizes. In one example, the given product may be Soda A. Soda A may be available in 12-ounce cans, which are sold in 6, 12, and 24-packs. Soda A may also be available or sold in 16-ounce, 1 liter, and 2-liter bottles, the 16-ounce bottles of which may be available in 6-packs. In the illustrated embodiment of FIG. 1, Soda A is being scanned in a 6-pack of bottles 24a, each containing 16 fluid ounces. Two further packages 24b, each holding 12 cans, and each can containing 12 fluid ounces, are to be scanned.

While the example above is described by way of a respective number of product containers for each different package and a respective product volume for each product container, it should be appreciated that the package quantity data may be any of a respective number of product containers for each different package, a respective product volume for each product container or total package, or a respective product weight for each product container or package. Of course, the package quantity data may include other and/or additional quantity data, such as, for example, products per container.

The database 33 stores this packages quantity data for the different package configurations. The database 33 also stores corresponding product identifiers, brand information, and manufacturer information for each stored product. Of course, while the above example is directed to an edible liquid product, it should be understood that the product may be any type of product.

The database 33 also stores respective product quantity promotion threshold data for each product of the plurality thereof. More particularly, a given manufacturer or retailer, for example, may wish to have a promotion on the given product. The promotion may be in the form of a coupon for a certain dollar amount off when a certain amount of the product is purchased. The product quantity promotion threshold data may be any of a threshold number of containers, package volume, volume per container, package weight, weight per container, etc. for the different product configurations.

As will be appreciated by those skilled in the art, typical quantity based promotions are applied when a threshold amount or quantity of the same product, in a same package configuration, is purchased. This would mean that a promotion would only be applied when, for example, three 12-packs of 12-ounce cans of the same product are purchased. In other words, if a consumer purchased two 12-packs of 12-ounce cans, and a 6-pack of 16-ounce bottles, the promotion would not apply in accordance with typical prior art approaches.

The controller 31 is coupled to the POS terminal 21, for example, via the Internet. The controller 31 receives product identifiers from the POS terminal 21 of products scanned or being purchased during a purchase transaction. For example, the controller 31 may receive the product identifiers in real time during the purchase transaction and from the POS terminal. The product identifiers may include the brand and/or manufacturer data, for example.

The controller 31 calculates, based upon the stored package quantity data, a given product quantity for a given purchase of a plurality of different package configurations of the given product at the POS terminal. The controller 31 compares the given product quantity to a respective product quantity promotion threshold from among the stored product promotion threshold data. For example, with respect to the Soda A example, above, the controller 31 may determine that a total of two 12-packs of 12-ounce cans 24b and a 6-pack of 16-ounce bottles 24a are being purchased based upon the received product identifiers from the POS terminal 21. Thus, 408 ounces or 30 containers are being purchased in the above example. The product promotion threshold data may include, for example, data corresponding to a promotion of, for example, $3.00 off, when 375 ounces or more, or 30 or more containers are being purchased. The controller 31, when the given product quantity is above the respective product quantity promotion threshold, then awards a digital promotion for redemption. In the above example, the $3.00 discount or promotion would be digitally awarded. The digital promotion may be redeemed, for example, without user intervention, at the POS terminal 21 during the purchase transaction.

Figure 3:
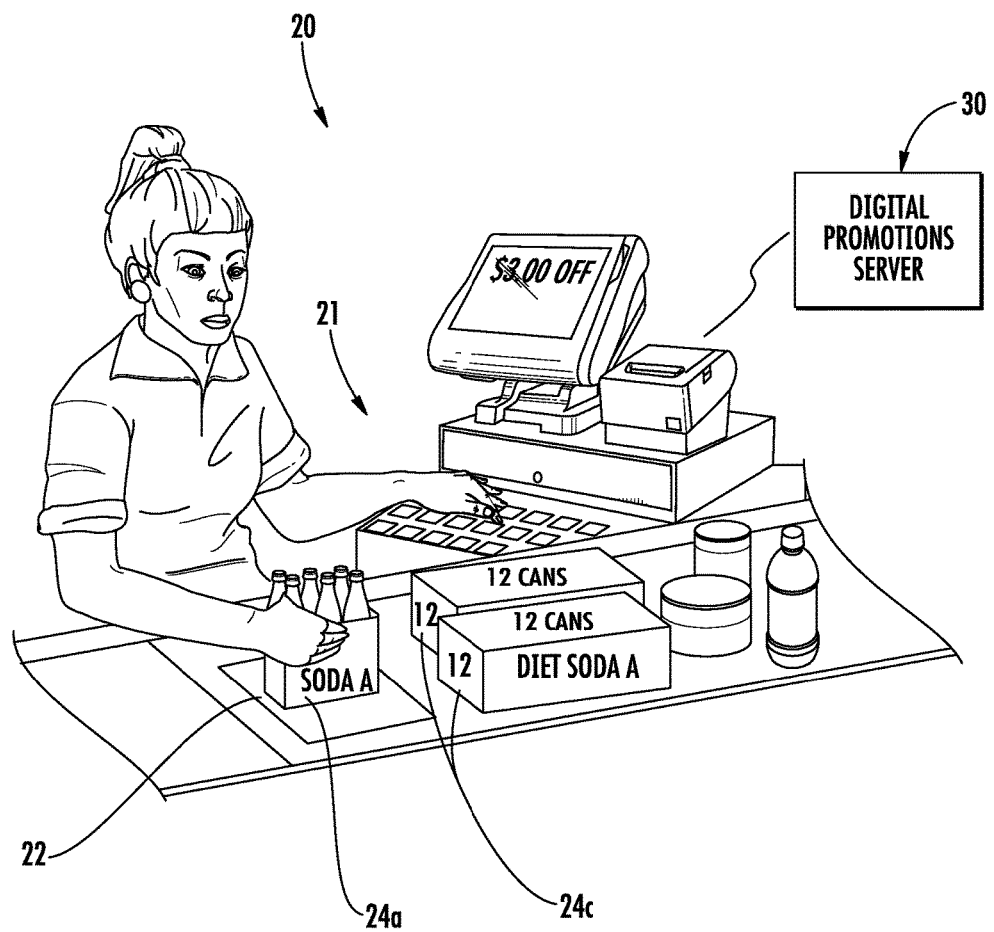
FIG. 3 is another diagram of a product checkout event using the system of FIG. 2.

Referring briefly to FIG. 3, in some embodiments, the given product may not be limited to the same product, but rather a same brand of products. With respect to the Soda A example above, Soda A being the brand, the controller 31 may determine the given product quantity for Regular Soda A, Diet Soda A, Cherry Soda A, etc. More particularly, if the consumer purchased two 12-packs of 12-ounce cans of Diet Soda A 24c, and a 6-pack of 16-ounce bottles Regular Soda A 24a, this would still meet the respective product quantity promotion threshold, and the digital promotion would still be awarded.

Figure 4:
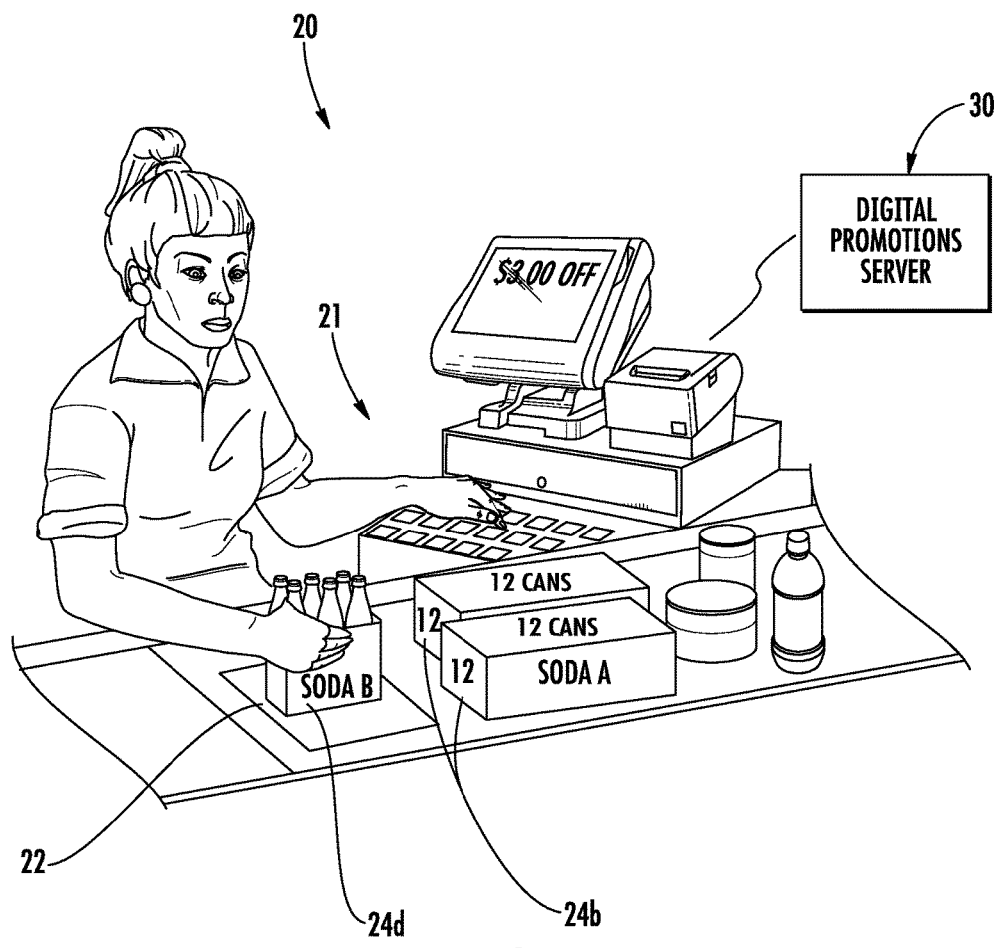
FIG. 4 is another diagram of a product checkout event using the system of FIG. 2.

Referring briefly to FIG. 4, the given product may not be limited to the same product or same brand, but rather a same manufacturer of products. With respect to the Soda A example above, Soda A, Soda B, and Soda C being the brands made by the manufacturer, Soda, Inc., the controller 31 may determine the given product quantity based upon any of Soda A, Soda B, or Soda C. More particularly, if the consumer purchased two 12-packs of 12-ounce cans of Soda A 24b and a 6-pack of 16-ounce bottles Soda B 24d, since both Soda A and Soda B are made by Soda, Inc., this would still meet the respective product quantity promotion threshold and the digital promotion would still be awarded. The digital promotion would still be awarded if any of Soda A and/or Soda B were replaced by Soda C, for example.

As will be appreciated by those skilled in the art, by storing the respective package quantity data for different package configurations in the database 33, what may be considered complex offers or promotions (i.e., those not based upon a single configuration of a single product) the controller 31 may be able to process a digital promotion. In other words, the way in which the data is stored in the database 33 and the cooperation with the controller 31, permits complex offers such as those based upon a product quantity promotion threshold of different package configurations to more quickly be processed. Conventional digital promotion processing based upon quantity was generally limited to a single package configuration or product identifier, for example. Thus, to process a given promotion with different package configurations would require hard-coded specific product identifiers, making it inefficient to hard code all permutations, and it would be likely to miss some permutations. To process all the hard coded permutations would increase processing speed of a digital promotion while providing a greater incentive to a consumer versus a single product in a single configuration.

A method aspect is directed to a method of awarding a digital promotion. The method includes storing in a database 33 respective package quantity data for different package configurations for each product from among a plurality of products, and respective product quantity promotion threshold data for each product of the plurality thereof. The method includes using a controller 31 coupled to the database 33 to calculate, based upon the stored package quantity data, a given product quantity for a given purchase of a plurality of different package configurations of the given product at a POS terminal. The method also includes using the controller 31 to compare the given product quantity to a respective product quantity promotion threshold from among the stored product promotion threshold data, and when the given product quantity is above the respective product quantity promotion threshold, then award a digital promotion for redemption.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system comprising:
a point-of-sale (POS) terminal;
a database configured to store respective package quantity data for different package configurations for each product from among a plurality of products, and to store respective product quantity promotion threshold data for each product of the plurality thereof, the respective package quantity data comprising a respective product volume for each of a number of product containers for each different package configuration, and the respective product quantity promotion threshold data comprising a respective product volume promotion threshold; and
a controller coupled to said database and said POS terminal, and configured to
calculate, based upon the stored package quantity data, a given product quantity for a given purchase of a plurality of different multi-container package configurations of the given product at the POS terminal,
compare the given product quantity to a respective product quantity promotion threshold from among the stored product promotion threshold data, and
when the given product quantity is above the respective product quantity promotion threshold, then award a digital promotion for redemption.

2. The system of claim 1 wherein said POS terminal is geographically spaced apart from said database and controller.

3. The system of claim 2 wherein said POS terminal and controller are configured to communicate via the Internet.

4. The system of claim 1 wherein said POS terminal is configured to redeem the digital promotion during the given purchase.

5. The system of claim 1 wherein said database is also configured to store respective manufacturer information for each product.

6. The system of claim 1 wherein said database is also configured to store respective brand information for each product.

7. A system comprising:
a database configured to store respective package quantity data for different package configurations for each product from among a plurality of products, and to store respective product quantity promotion threshold data for each product of the plurality thereof, the respective package quantity data comprising a respective product volume for each of a number of product containers for each different package configuration, and the respective product quantity promotion threshold data comprising a respective product volume promotion threshold; and
a controller coupled to said database and configured to
calculate, based upon the stored package quantity data, a given product quantity for a given purchase of a plurality of different package configurations of the given product at a point-of-sale (POS) terminal,
compare the given product quantity to a respective product quantity promotion threshold from among the stored product promotion threshold data, and
when the given product quantity is above the respective product quantity promotion threshold, then award a digital promotion for redemption at the POS terminal for the given purchase.

8. The system of claim 7 wherein said database is also configured to store respective manufacturer information for each product.

9. The system of claim 7 wherein said database is also configured to store respective brand information for each product.

10. A method of awarding a digital promotion comprising:
storing in a database respective package quantity data for different package configurations for each product from among a plurality of products, and respective product quantity promotion threshold data for each product of the plurality thereof, the respective package quantity data comprising a respective product volume for each of a number of product containers for each different package configuration, and the respective product quantity promotion threshold data comprising a respective product volume promotion threshold; and
using a controller coupled to the database and the POS terminal to
calculate, based upon the stored package quantity data, a given product quantity for a given purchase of a plurality of different package configurations of the given product at a POS terminal,
compare the given product quantity to a respective product quantity promotion threshold from among the stored product promotion threshold data, and
when the given product quantity is above the respective product quantity promotion threshold, then award a digital promotion for redemption.

11. The method of claim 10 wherein the POS terminal is geographically spaced apart from the database and controller.

12. The method of claim 10 further comprising storing in the database respective manufacturer information for each product.

13. The method of claim 10 further comprising storing in the database respective brand information for each product.

14. A system comprising:
a database configured to store respective package quantity data for different package configurations for each product from among a plurality of products, and to store respective product quantity promotion threshold data for each product of the plurality thereof, the respective package quantity data comprising a respective product weight for each of a number of product containers for each different package configuration, and the respective product quantity promotion threshold data comprising a respective product weight promotion threshold; and
a controller coupled to said database and configured to
calculate, based upon the stored package quantity data, a given product quantity for a given purchase of a plurality of different package configurations of the given product at a point-of-sale (POS) terminal, compare the given product quantity to a respective product quantity promotion threshold from among the stored product promotion threshold data, and when the given product quantity is above the respective product quantity promotion threshold, then award a digital promotion for redemption at the POS terminal for the given purchase.

15. The system of claim 14 wherein said database is also configured to store respective manufacturer information for each product.

16. The system of claim 14 wherein said database is also configured to store respective brand information for each product.

17. A system comprising:

a database configured to store respective package quantity data for different multi-container package configurations for each product from among a plurality of products, and to store respective product quantity promotion threshold data for each product of the plurality thereof, the respective package quantity data comprising a respective number of product containers for each different multi-container package configuration, and the respective product quantity promotion threshold data comprising a respective number of product containers promotion threshold; and a controller coupled to said database, and configured to calculate, based upon the stored package quantity data, a given product quantity for a given purchase of a plurality of different multi-container package configurations of the given product at a point-of-sale (POS) terminal, compare the given product quantity to a respective product quantity promotion threshold from among the stored product promotion threshold data, and when the given product quantity is above the respective product quantity promotion threshold, then award a digital promotion for redemption at the POS terminal for the given purchase.

18. The system of claim 17 wherein said database is also configured to store respective manufacturer information for each product.

19. The system of claim 17 wherein said database is also configured to store respective brand information for each product.

* * * * *